Dec. 11, 1962 D. A. DI TIRRO ETAL 3,067,767
CONTROL SYSTEM FOR FLUID ACTUATED DEVICES
Original Filed June 18, 1953
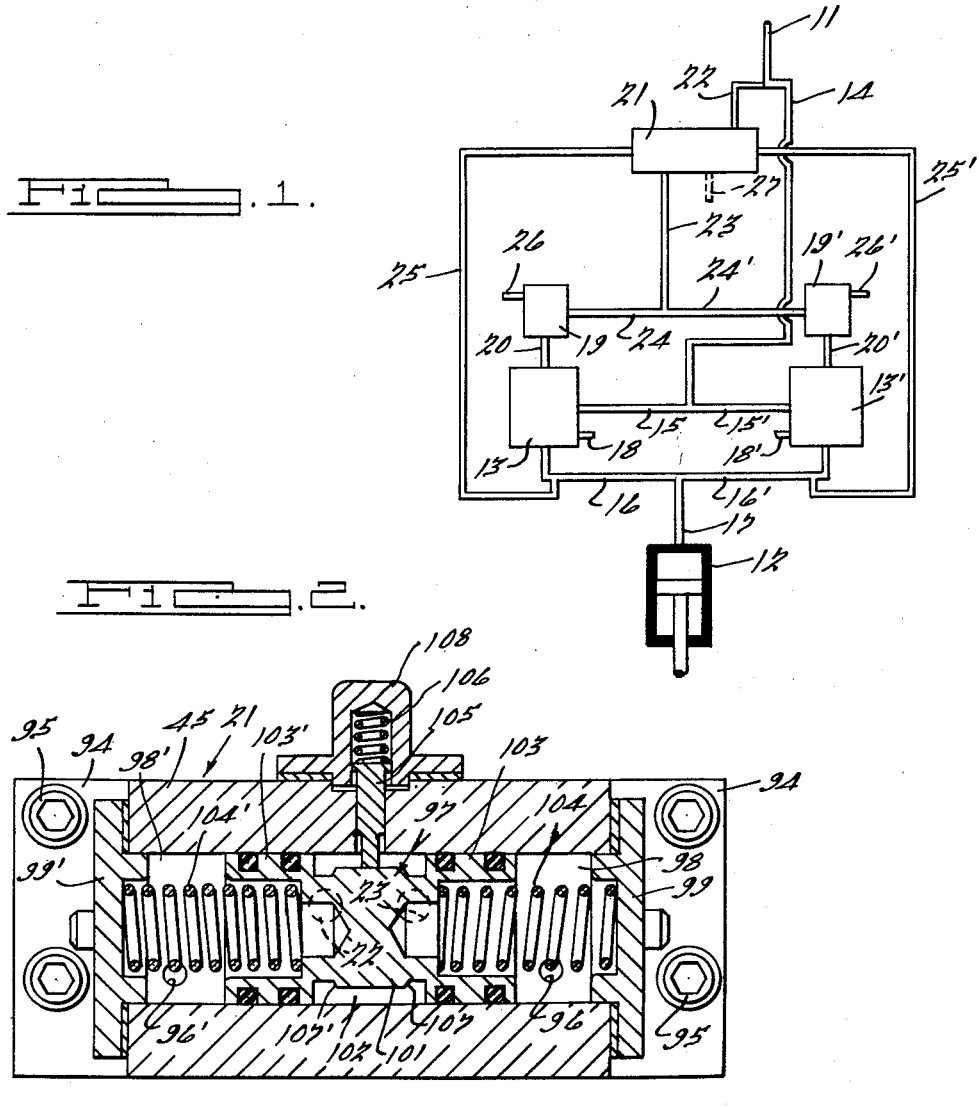
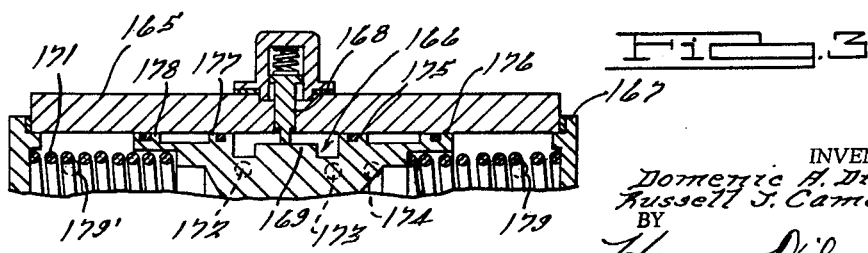
INVENTORS.
Domenic A. DiTirro
Russell J. Cameron
BY
Barnes, Kisner & Pierce
ATTORNEYS.

3,067,767
CONTROL SYSTEM FOR FLUID ACTUATED
DEVICES
Domenic A. Di Tirro, Royal Oak, and Russell J. Cameron, Birmingham, Mich., assignors to Ross Operating Valve Company, Detroit, Mich., a corporation of Michigan
Original application June 18, 1953, Ser. No. 362,542, now Patent No. 2,906,246, dated Sept. 29, 1959. Divided and this application Dec. 5, 1958, Ser. No. 788,249
1 Claim. (Cl. 137—461)

This invention relates to control systems for fluid pressure actuated devices, and more particularly to safety means for such devices operable in cases of failure of some part of the system, such as the master or pilot valves. This application is a division of application Serial No. 362,542, filed June 18, 1953, now Patent No. 2,906,246, issued September 29, 1959, the latter being a continuation-in-part of application Serial No. 342,786, now abandoned, filed March 17, 1953, by the present applicants.

The cyclic operation of fluid pressure actuated devices such as pneumatically actuated clutches and brakes for presses and similar machines entails the use of control valves for admitting and releasing the fluid under pressure to the devices, and in cases of failure of these control valves there arises the danger of injury to the operator or damage to the machine due to continued and uncontrolled application of fluid pressure. It is highly desirable in such cases that automatic means be provided for shutting off the supply of air or other fluid or at least reducing the supply pressure to the point where the machine is inoperative, so that injury or damage is avoided.

The present invention has for an object the provision of an improved system for achieving this result, and provides means for automatically sensing the failure of a control valve and for instantaneously shutting off or reducing the fluid pressure at the fluid actuated device until the system can be conveniently repaired by the operator.

Other objects, features, and advantages of the present invention will become apparent from the subsequent description, taken in conjunction with the accompanying drawings.

In the drawings:

FIGURE 1 is a diagrammatic view of one form of a control system for a fluid actuated device according to the invention, in which a safety means controls the fluid supply to the pilot valves, or alternatively, both supply and exhaust to these valves:

FIGURE 2 is a cross-sectional view of a preferred safety valve of the shuttle type, and FIGURE 3 is a fragmentary cross-sectional view similar to FIGURE 2 and showing a modified safety valve which serves to exhaust the control valves as well as shut off their fluid supply.

FIGURE 1 illustrates one arrangement of the safety control system according to the present invention, the system controlling the application of fluid pressure from a supply line 11 to a single acting cylinder 12. As will appear more clearly below, the invention could also be applied to systems for controlling double acting fluid pressure motors by a duplication of parts or a variation in type of valve, and could likewise be applied to other types of fluid actuated devices. The system includes a pair of main control valves 13 and 13' which control the supply and exhaust for motor 12. The fluid is supplied to the main valves by means of conduit 14 leading from supply line 11 and having cross branches 15 and 15' leading to the control valves. The valves have outlet connections 16 and 16' leading to motor 12, these lines joining into a single conduit 17. Valves 13 and 13' may be of a three-way type having exhaust ports 18 and 18' respectively, and it will therefore be seen that the valves operate in parallel to supply and exhaust the fluid which operates motor 12.

The movement of main valves 13 and 13' is controlled by pilot valves 19 and 19' which may for example be solenoid operated valves having fluid connections 20 and 20' to the actuating portions of main valves 13 and 13'. The fluid for supplying the pilot valves and lines 20 and 20' is also taken from main supply line 11 but passes through a normally open safety valve 21 by means of conduits 22, 23, and branch conduits 24 and 24'. As described in detail below, safety valve 21 is movable from its inactive normal position to a safety position in response to pressure differentials caused by lack of synchronism between main valves 13 and 13'. This lack of synchronism could be caused for example by failure of a part in one of the main valves or in one of the pilot valves. Lines 25 and 25', which may be termed sensing lines or conduits, represent diagrammatically the connections by which pressure differentials between the parallel control branches may be sensed by safety valve 21. These sensing conduits are shown in FIGURE 1 as being connected to the outlet lines 16 and 16' of main valves 13 and 13' respectively, although the sensing conduits could be located in other parts of the system, for example at other points in the main valves or at the pilot valves 19 and 19'.

In the operation of the system shown in FIGURE 1, the safety valve 21 will normally remain inactive and in its open position, allowing free passage of fluid from main supply line 11 to the pilot valves 19 and 19'. These valves in turn will alternately move main valves 13 and 13' in synchronism between their supply and exhaust positions, thus cycling motor 12. During this operation, the pressure in lines 16 and 16' leading from the main valves to the motor 12 will at all times be substantially equal, since the main valves are operating in parallel. Should one of the main valves or one of the pilot valves fail to function properly, a pressure differential will immediately set up between lines 16 and 16', and this pressure differential will be transmitted by sensing lines 25 and 25' to safety valve 21. This valve will immediately move into its safety position, shutting off the fluid supply to pilot valves 19 and 19', or in other forms of the invention, connecting the pilot valve supply lines to exhaust with or without shut-off of fluid supply.

As described in detail below, the relation of pilot valves 19 and 19' to their respective main valves is such that when lines 20 and 20' are pressurized, the main valves are moved to their supply position, supplying fluid to lines 16 and 16'. When lines 20 and 20' are connected to exhaust openings 26 and 26' of the pilot valve, main valves 13 and 13' are moved into their exhaust position, in which lines 16 and 16' are connected to exhaust ports 18 and 18' respectively. It will therefore be seen that when safety valve 21 is held closed, at least one of the main valves 13 and 13' will be moved into and will remain in its exhaust position.

FIGURE 1 also illustrates an alternate method of operation of safety valve 21 in which the supply line 23 for pilot valves 19 and 19' is not only cut off from fluid supply, but is also connected to exhaust through safety valve 21. The exhaust connection is indicated in FIGURE 1 in dotted lines at 27, and when the safety valve moves into its safety position, exhaust line 27 is connected to line 23 at the same time that the latter line is cut off from supply line 22. FIGURE 3, which is described in detail below, illustrates a three-way type of safety valve which could be used in carrying out this exhausting action. It will be seen that a system using a valve such as is shown in FIGURE 3 will not only shut off fluid supply to the pilot valve supply line but will connect the pilot valve supply line to exhaust so that no fluid is at any time trapped in the pilot valve connections, and the system can be disenabled immediately when the safety valve moves into its safety position.

The construction of safety valve 21 is best shown in FIGURE 2, wherein it will be seen that the valve includes a spool member generally indicated at 97 slidable within housing 45. Spool 97 serves to form chambers 98 and 98' at either end thereof, the outer ends of these chambers being closed by housing caps 99 and 99'. Sensing passages 96 and 96' are connected with chambers 98 and 98', these passages being a substantial distance from spool 97 when the latter is in its central position as shown in FIGURE 2. The central portion 101 of spool 97 is recessed to form an annular chamber 102, and inlet passage 22 (shown in dot-dash lines in FIGURE 2) as well as outlet passage 23 are connected with this annular chamber. The axial positions of passages 22 and 23 are such that when spool 97 is in its central position, the piston portions 103 and 103' thereof are immediately adjacent passages 23 and 22 respectively. In other words, if spool 97 is moved either to the right or left, the communication between passages 22 and 23 will be cut off either by piston 103 or piston 103'. Helical springs 104 and 104' are disposed between spool 97 and opposite ends of the housing, that is, caps 99 and 99', and thus serve to hold spool 97 in its central position.

Means are provided for locking spool 97 when it is moved either to the right or left into its cutoff position by pressure differentials existing between chambers 98 and 98'. In the illustrated embodiment, this means comprises a slidable detent 105 mounted in housing 45 and urged by a helical spring 106 against central portion 101 of the spool. This central portion is provided with annular shoulders 107 and 107', so that when the spool is moved in either direction an amount sufficient to close either passage 22 or 23, detent 105 will engage one of the shoulders to hold the spool in its cutoff position. A cap 108 removably held by bolts 109 serves to guide detent 105 and retain spring 106, so that by removing cap 108 the detent 105 can be withdrawn, allowing the spool to return to its normally open position.

FIGURE 3 illustrates another type of safety valve which serves not only to cut off the fluid supply to the control valves but also acts to connect the control valve to exhaust, and this valve therefore includes the exhaust connections indicated by reference numeral 27 in FIGURE 1. The valve is shown for illustrative purposes as being of similar construction to that shown in FIGURE 2, although it will be understood that other types of constructions could be used. The valve includes a housing 165 enclosing a slidable spool generally indicated at 166, the housing being closed by end caps 167. A detent 168 engages the recessed central portion 169 of the spool which is provided with oppositely disposed shoulders engageable by the detent when the valve is moved from its central position, in which it is normally held by springs 171. The housing is provided with a supply port indicated at 172, an outlet port 173 leading to the control valves, and an exhaust port 174. The right end of spool 166 as shown in FIGURE 7 is provided with spaced lands 175 and 176, land 175 being disposed between ports 173 and 174 when the spool is in its central position. The left end of the spool is provided with spaced lands 177 and 178, land 177 being to the left of port 172 when the spool is in its central position. The housing is also provided with sensing ports 179 and 179' which lead to the chambers formed by the two ends of the spool, so that pressure differentials between the parallel branches of the system will cause spool 166 to shift either to the left or right.

It will be seen that when in its central or normal position, the spool will serve to connect supply port 172 with control valve port 173, exhaust port 174 being sealed off by land 175. If spool 166 is shifted to the left due to a pressure differential, detent 168 will hold the spool in such a position that supply port 172 is cut off from control valve port 173 by land 175, while port 173 is connected to exhaust port 174 by the annular chamber formed between lands 175 and 176. Should spool 166 be moved to the right, detent 168 will hold it in such a position that port 172 is sealed off from port 173 by land 177, while port 173 is connected to port 174 by the annular chamber surrounding recessed portion 169 of the spool. In either position therefore, the safety valve will serve not only to cut off the fluid supply to the control valves, but will also serve to vent these control valves through exhaust port 174.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claim.

What is claimed is:

In a device of the class described, a valve body having a bore therein, inlet and outlet ports in said body, said ports being axially spaced along and connected with said bore, a spool valve within said bore, said valve having a recessed central portion and first and second annular seals outwardly of said recessed portion, the spool valve being movable from a central position in which said inlet and outlet ports are connected by said recessed portion in either direction to extreme positions in which one of said seals separates said inlet and outlet ports, a pair of helical compression springs disposed within said bore and engageable with opposite ends of said valve spool, end elements on said valve body supporting the outer ends of said springs, the springs normally maintaining the valve spool in its central position, the valve spool and body forming first and second end chambers within which said springs are disposed, said chambers being separated from each other and from said inlet and outlet ports by means which prevents fluid flow between said inlet and outlet ports and said chambers, the valve spool being responsive to a pressure differential between said chambers in either direction to move from its central position to either of its extreme positions, and detent means engageable with said spool valve when the latter is moved in either direction to hold the spool valve in either extreme position, said detent means including an element movable between a retracted position and a latching position, the configuration of said last-mentioned element being such that said valve spool will be unresponsive to further changes in the pressure differential between said chambers after the latching element moves to its latching position.

References Cited in the file of this patent
UNITED STATES PATENTS

| | | |
|---|---|---|
| 829,598 | Peterson | May 15, 1906 |
| 1,239,617 | Newcombe | Sept. 11, 1917 |
| 2,195,214 | Jacob | Mar. 26, 1940 |
| 2,311,955 | Merker | Feb. 23, 1943 |
| 2,496,904 | Bent | Feb. 7, 1950 |
| 2,568,311 | Wise | Sept. 18, 1951 |
| 2,625,168 | Charlson | Jan. 13, 1953 |
| 2,648,346 | Deardorff | Aug. 11, 1953 |
| 2,718,236 | Nowee | Sept. 20, 1955 |
| 2,729,226 | Jones | Jan. 3, 1956 |
| 2,802,484 | Sheets | Aug. 13, 1957 |

FOREIGN PATENTS

| | | |
|---|---|---|
| 333,365 | Great Britain | Aug. 14, 1930 |